United States Patent [19]

McRae et al.

[11] 4,096,442
[45] Jun. 20, 1978

[54] CROSSTALK CORRECTOR AND DECISION DEVICE FOR FSK

[75] Inventors: Daniel Dix McRae; Earl Ford Smith, both of Melbourne, Fla.

[73] Assignee: Harris Corporation, Cleveland, Ohio

[21] Appl. No.: 790,940

[22] Filed: Apr. 26, 1977

[51] Int. Cl.² ............................................. H03D 3/02
[52] U.S. Cl. .................................. 329/112; 325/480; 329/122
[58] Field of Search ...................... 325/472, 473, 480; 329/110, 112, 122, 130, 131

[56] References Cited

U.S. PATENT DOCUMENTS 3,970,946 7/1976 Matsuo ................................. 329/112
4,027,250 5/1977 Lang ..................................... 325/473

*Primary Examiner*—John Kominski
*Attorney, Agent, or Firm*—Craig & Antonelli

[57] ABSTRACT

Demodulation of M-ary continuous-phase FSK signals is effected in accordance with phase measurements taken at symbol transition times. The phase error caused by intersymbol interference is estimated by knowledge of the type and degree of distortion which is principally dependent upon the frequency difference between successive data symbols and phase distortion characteristics of the channel filter. Pairs of phase nodes are selected at each symbol transition time and, from each pair, a tentative choice is made by using the expected phase distortion based on adjacent phase node pairs. Refined choices are then made using the estimated phase distortion based on adjacent tentative choices. Differences between successive tentative choices of phase node selections yield a sequence of frequencies making up the FSK signal. Circuitry implementation embraces the use of phase-locked loop detectors and digital decision logic including programmable read-only memories.

14 Claims, 13 Drawing Figures

CROSSTALK CORRECTOR AND DECISION DEVICE FOR FSK

FIELD OF THE INVENTION

The present invention relates to a system for demodulating M-ary continuous-phase FSK (frequency-shift keying) signals. In particular the invention involves a new approach for processing coherent phase measurements taken once per symbol time for M-ary continuous phase FSK and making decisions as to which frequency was transmitted for each symbol time.

BACKGROUND OF FSK SIGNALLING

In general, an FSK transmitted signal S(t) may be mathematically expressed by the following equation:

$$S(t) = A \cos(\omega_c t + \phi(t)) \quad (1)$$

where $A$ = signal amplitude
$\phi(t)$ = information-carrying phase function, and
$\omega_c$ = carrier frequency.

In equation (1) above, the frequency of the transmitted sinusoid during any symbol-time is represented by the derivative of the argument $(\omega_c t + \phi(t))$. Thus, the instantaneous frequency $\omega(t)$ is expressed as:

$$\omega(t) = \omega_c + \phi'(t), \quad (2)$$

where $\phi'(t)$ is the frequency relative to the carrier frequency and is the information conveying frequency component. The $\phi(t)$ term of equation (1) is the phase of the transmitted sinusoid relative to the phase of a sinusoid of the carrier frequency $\omega_c$. The actual phase function $\phi(t)$ resulting from the transmission of a particular sequence of information bits is defined as a transmitted "phase trajectory".

In FIG. 1, there are shown all possible phase trajectories which can result when any binary (M=2) FSK sequence of three bits is transmitted with a modulation index $h$, assuming that relative to the carrier $\omega_c$ the phase is zero at time $t = 0$. The particular path taken through the phase trajectory trellis shown in FIG. 1 is dependent upon the bit sequence transmitted. The binary bit sequence 1-0-1 is shown in FIG. 1 as following the phase trajectory path $0 - 2\pi h$, $2\pi h - 2\pi h$, $2\pi h - 4\pi h$, the phases at the ends of the bit times being prescribed phases shifted from each other by $2\pi h$ radians. The phases at the ends of the bit times are referred to as "phase nodes". Thus, for each frequency F$i$ transmitted during a symbol time $T_s$, there will be an associated prescribed phase shift between phase nodes at the respective beginning and end of the symbol time.

FIG. 2 illustrates an example of a transmitted bit represented by a frequency F$i$. Two cycles of the frequency F$i$ are shown as making up the bit time with a zero phase difference between the beginning and end of the symbol time. For the three bit (101) example given below, there is a $2\pi h$ radian phase shift for the first and third bits, and a zero phase shift for the second bit. Since, by definition, each bit is represented by a prescribed frequency (e.g. a "0" bit is represented as F0, and a "1" bit is represented as F1) by detecting the phase differences from the beginning to the end of each symbol time $T_s$, a determination of the frequency transmitted during the symbol time can be effected. Thus, by detecting the phase differences for $0-2\pi h$, $2\pi h-2\pi h$, $2\pi h-4\pi h$, the transmitted signal F1-F0-F1 can be detected. Unfortunately, due to disturbances, such as those introduced by intersymbol interference, the phase nodes of the received FSK signals do not always coincide with their intended values of some multiple of $2\pi h$. Thus, the measured phases and, consequently, determined phase differences on the basis of such measured phases may lead to errors in frequency determination and, ultimately in detected FSK information.

SUMMARY OF THE INVENTION

Briefly, in accordance with the present invention, phase measurements are carried out on the received FSK signal once per symbol time, at times corresponding to the occurrence of the phase nodes. The phase measured at a node time will, due to intersymbol interference and noise, be shifted from its intended and transmitted phase by some prescribed error. Since a major portion of the phase error is due to intersymbol interference which is related to the difference in frequencies of two successive symbols, it is possible to make an educated guess as to the probable phase error for a node time by assuming that one knows the correct phase nodes immediately prior and immediately subsequent to the phase node of interest.

To this end, the system of the present invention carries out successive phase measurements and effects an analysis with respect to groups of three successive node times in order to estimate the phase distortion for the middle node time of three successive phase node measurements. Once the phase distortion for the middle node time is estimated, the system then uses this estimate to establish a threshold for selecting a tentative phase node for the middle node time. Progressing to a subsequent measurement, this middle node time now becomes the first node time of the next three node times and the selected phase node for the previous middle node time now becomes the assumed phase node for the first node time of the next three node times. The above process is now repeated and the system then steps along to subsequent node times to estimate the phase errors and select the phase nodes in accordance therewith. In this manner, a reasonably accurate prediction of the successive phase nodes can be obtained from which the successively transmitted frequencies are determined.

The system of the invention also effects a refinement of the phase estimates by analyzing the resultant phase node sequence and, where necessary, modifying established phase errors, if such modification would result in a change in the phase node estimates.

In accordance with the preferred embodiment,, quaternary FSK signals (with a mod. index $h = \frac{1}{4}$) are filtered and applied to a "times-8" frequency multiplier. The output of the frequency multiplier is coupled to a pair of phase-locked loops which are locked to the two lowest frequencies, respectively. The phase of the filtered input signal is measured relative to the lowest frequency and is quantized by an A-D converter into one of eight possible phases at the beginning of each symbol time, to provide a tentative choice of two adjacent phase node candidates near which the measured phase lies. At the same time, a refinement or vernier phase measurement is effected to establish an estimate of the phase error which caused the measured phase to lie between the two adjacent phase node candidates. The candidate phases and phase verniers are store in registers for three successive symbol times and the stored values are used to judge the accuracy of the initial phase estimates. Any necessary corrections are made and, on the basis of the differences in phases at the beginning and end of each symbol time, the associated frequencies are determined. Programmable read-only memories are coupled to the storage registers to make the necessary judgements for precise phase detection and eventual frequency determination.

DETAILED DESCRIPTION

Although the FSK demodulation technique in accordance with the present invention is applicable to M-ary FSK signals, the present description will treat a preferred embodiment of the invention wherein the demodulation techniques are applied to quaternary (4-ary) continuous-phase FSK signals. The modulation index chosen was 1/8 so that the spacing between adjacent frequencies is $2\pi h = 2\pi(\frac{1}{8}) = \pi/4$ or 45°.

Figure 1:
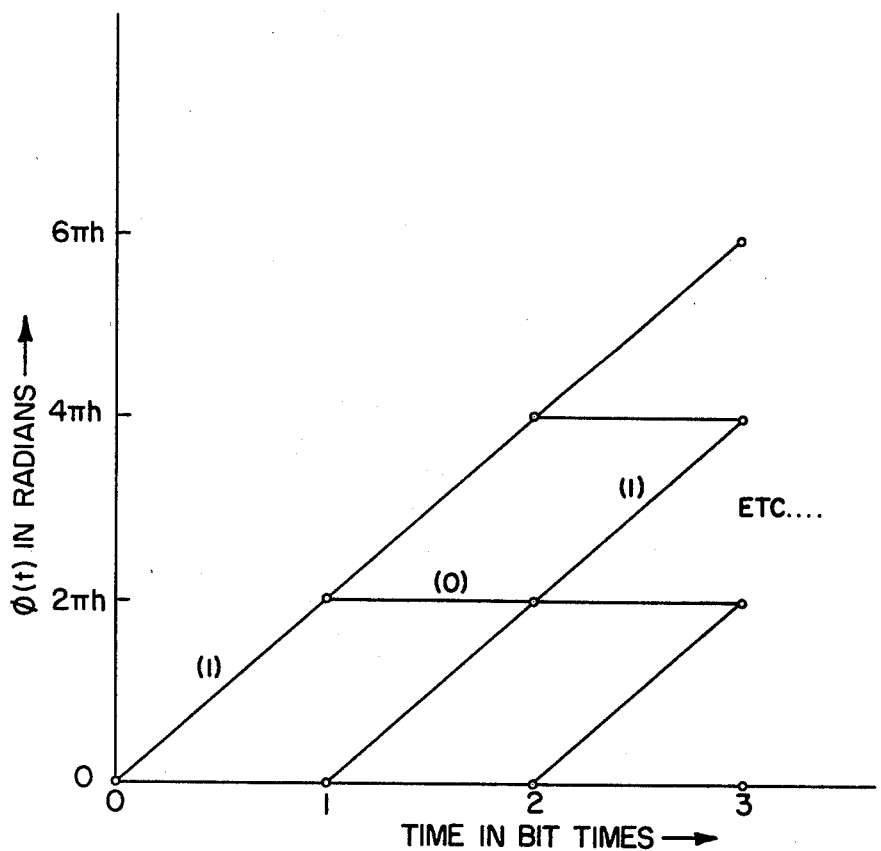
FIG. 1 illustrates a phase trajectory trellis for binary FSK signals.
Figure 2:
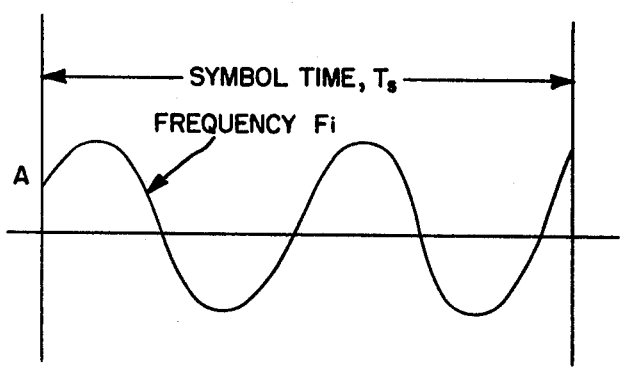
FIG. 2 shows an exemplary frequency signal employed in FSK signalling.
Figure 3:
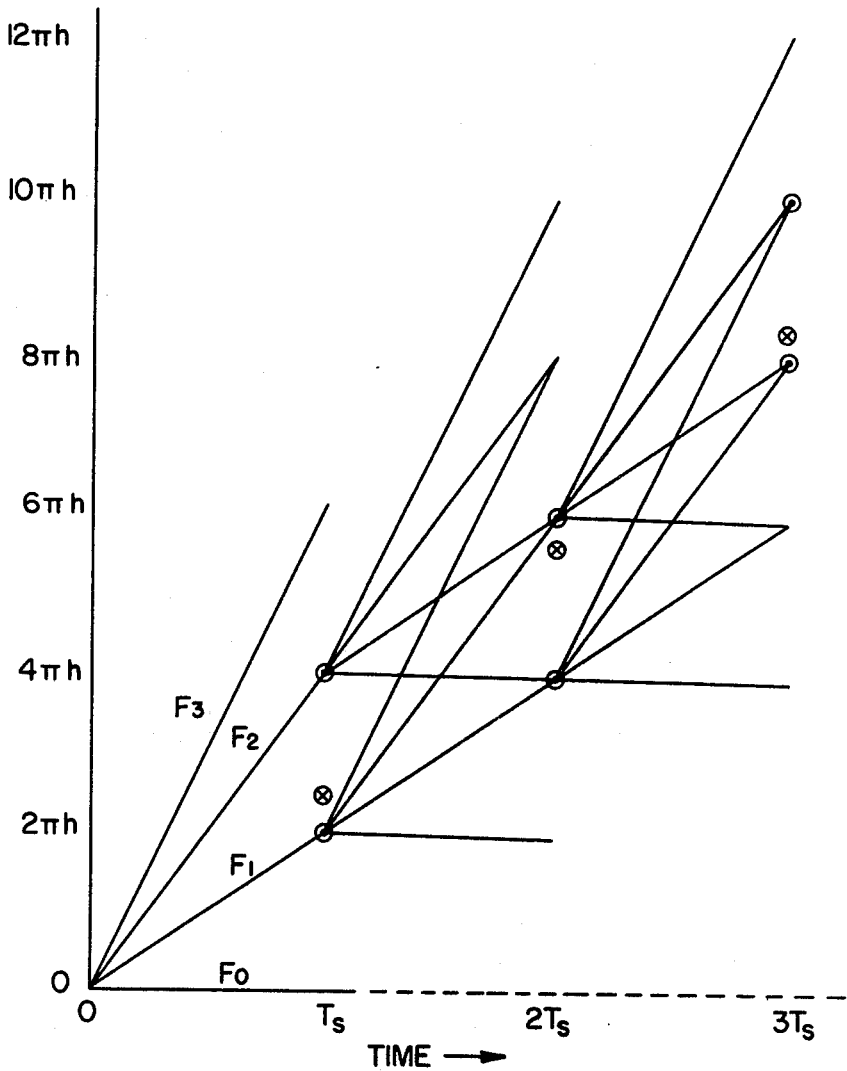
FIG. 3 illustrates a phase trajectory trellis and exemplary phase node measurements for quaternary FSK signals.

FIG. 3 illustrates a phase trajectory trellis over three symbol times 0 - $3T_s$ for a 4-ary FSK signal. The four FSK frequencies are F0, F1, F2, and F3, with the lowest frequency being F0, which is used as a reference for phase measurements and, hence, the phase difference $\Delta\phi_{F0}$ between the beginning and end of its symbol time $T_s$ equals zero. With a mod. index $h = \frac{1}{8}$, then the respective phase differences are as follows: $\Delta\phi_{F1} = 45°$, $\Delta\phi_{F2} = 90°$, $\Delta\phi_{F3} = 135°$. The symbols X shown at the node measurement times in FIG. 3 correspond to exemplary measured phases. The measured phases do not correspond exactly to phase nodes of the trellis due to distortion such as that introduced during the filtering of the received FSK signal, and this phase offset introduced into the phase measurement must be corrected if an accurate phase difference and frequency determination are to be achieved.

For this purpose, the present invention employs a technique of initially choosing phase node candidates on the trellis which are most likely to correspond to the actual phase transmitted. These most likely phase node candidates consist of pairs of trellis phase nodes near which a respective measured phase lies. In FIG. 3, each candidate phase node is surrounded by a circle. The candidate node-pairs and the portions of the trellis connecting them for symbol times $T_s$, $2T_s$, and $3T_s$ are more clearly illustrated in FIG. 4.

Figure 4:
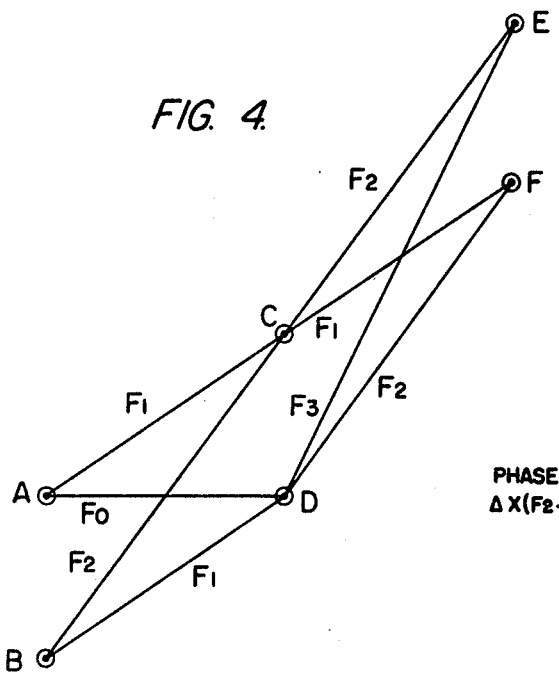
FIG. 4 illustrates a partial 4-ary phase trajectory trellis associated with the node measurements illustrated in FIG. 3.

The scheme employed by the present invention groups phase node times into groups of three successive times, such as $T_s$, $2T_s$ and $3T_s$, as shown in FIG. 3 and isolated in FIG. 4. Within these three successive phase node times, the phase error at the middle time (e.g. $2T_s$ in the present example) is estimated by analyzing the trajectories of the trellis defined by the candidate phase node pairs A-B, C-D, E-F. More specifically, the phase error is principally due to the distortion introduced into the FSK signal as a result of the filtering used in the system to filter the FSK signals. With this type of filtering, the magnitude of the phase distortion at a node time (adjusted for a fixed delay time through the filter) is proportional to the transmitted frequency change at the node.

Figure 5:
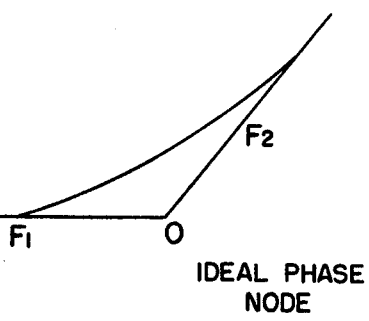
FIG. 5 shows the distortion effect of a nominal linear filter on an FSK signal.
Figure 6:
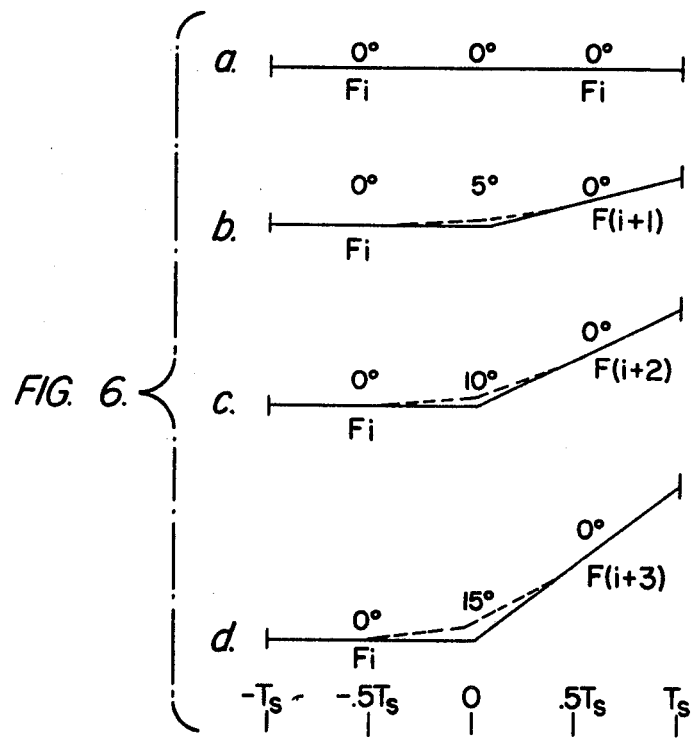
FIG. 6 shows phase trajectory distortion for a fourth-order linear BPF.

FIG. 5 illustrates the resultant phase distortion at a node proportional to the frequency change (F2 – F1) at the node, where F2 and F1 are respective symbol frequencies. For a four-pole modified linear phase filter (herein referred to as a nominal filter) having a noise bandwidth equal to the symbol rate, node phase distortion occurs for the frequency changes as shown in FIG. 6. The distortion is symmetrical for negative frequency transitions (i.e. a frequency shift to a lower frequency, such as F3–F1 and no filter distortion of any significance extends beyond one symbol time $T_s$. In accordance with the present invention, these varying degrees of distortion are used to calculate threshold locations between the pair of candidate nodes C and D so as to make a tentative decision as to the phase node for that symbol time. From the node pair illustration shown in FIG. 4, it is easily determined that choosing nodes A and F gives the same magnitude of phase distortion at node pair C-D as does choosing nodes B and E. Namely, for a nominal filter having the distortion characteristics illustrated in FIG. 6, choosing phase nodes B and E yields a 0° phase distortion at node C and a 10° phase distortion at node D. Similarly, choosing phase nodes A and F yields a 0° phase distortion at node C and a 10° phase distortion at node D. On the other hand, choosing nodes A and E yields a 5° phase distortion at node C and a 15° phase distortion at node D. Likewise, choosing nodes B and F yields a –5° phase distortion at node C and a –15° distortion at node D. Thus, the magnitude of error in the estimated phase distortion at the node time for phase node pair C-D is, at most, 5°. This is not only true for the example shown in FIGS. 3 and 4, but it also applies for any sequence of three node pairs. This small degree of error significantly enhances the reliability of the estimated choice for the phase node C or phase node D tentatively chosen after correcting the measured phase value by the estimated phase distortion.

The threshold locations are employed to measure, in incremental steps, the degree of deviation of the measured phase from the lower phase node of the phase node pair between which the measured phase lies. Depending upon which threshold level is exceeded, a determination can be made as to the amount of phase distortion and, consequently, which node of the phase node pair should be selected as the tentative phase. For the filter distortion of FIG. 6, it can be easily determined (by trying all combinations of frequency transitions and considering the cross-talk for any legitimate transition) that for any adjacent pair of legitimate transmitted frequencies, there are only five appropriate threshold locations between each adjacent pair of legitimate transmitted end-phases.

Figure 7:
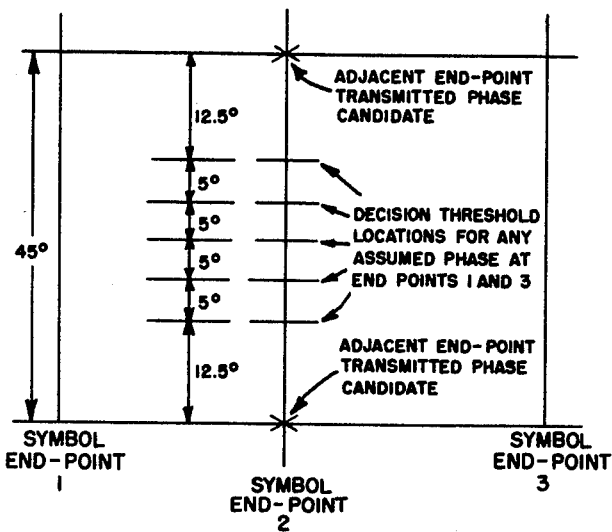
FIG. 7 illustrates appropriate decision threshold locations for a nominal filter.
Figure 8:
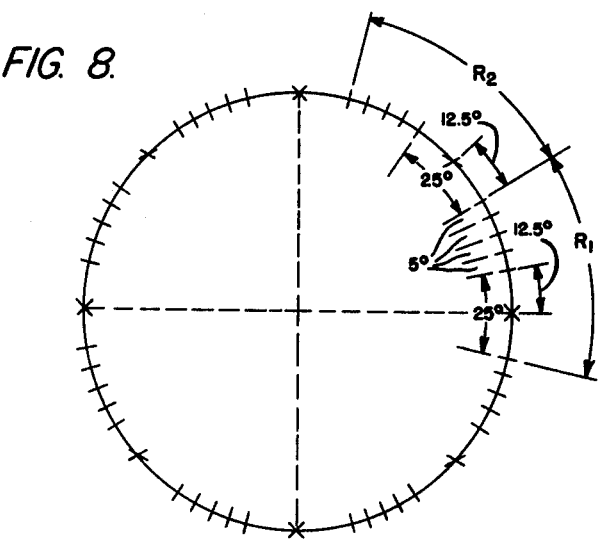
FIGS. 8, 9, and 10 are polar plots of phase node spacings employed in accordance with the measurement techniques used by the present invention.

FIG. 7 depicts these appropriate decision threshold locations for a nominal filter. Since the transmitted phases are separated by 45°, there are only eight possible transmitted phases (modulo $2\pi$) at any symbol endpoint as indicated by the X's in the polar plot shown in FIG. 8. With only five possible threshold locations between each pair, the entire phase space is divided into the forty regions shown in FIG. 8. In accordance with the present invention, a first phase detection measurement is carried out to determine near which adjacent pair of phase nodes (indicated by the X's in FIG. 8) the measured phase lies. Next, a vernier measurement is made with the threshold increments lying between the candidate phases to arrive at a choice as to which candidate should be tentatively selected as the correct phase node.

Figure 11:
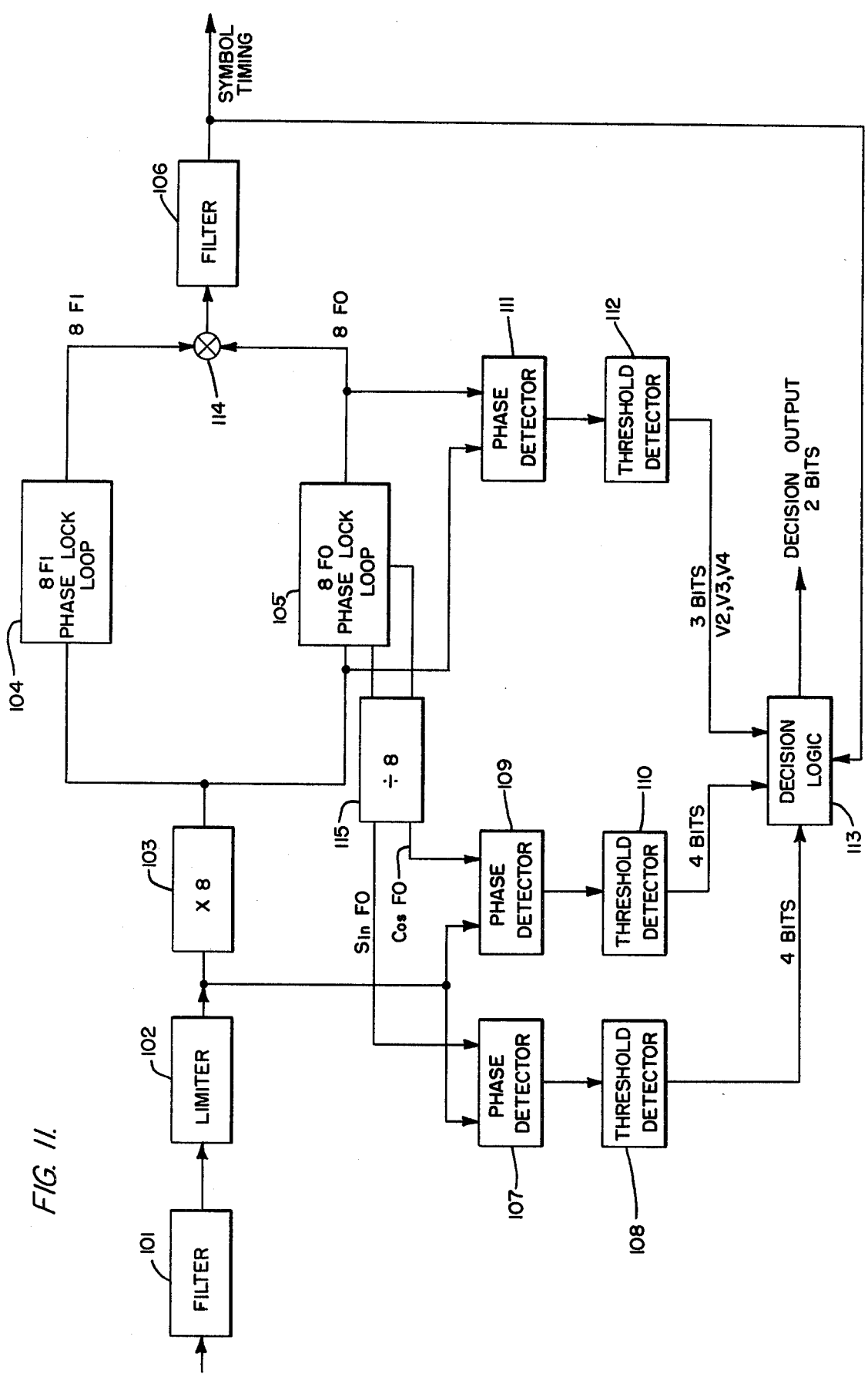
FIG. 11 is a schematic block diagram of the FSK demodulator of the present invention.

The demodulation circuitry for implementing this process is shown in FIG. 11. The received FSK signal is initially applied to four-pole modified linear phase filter 101. After its amplitude is adjusted by limiter 102, the filtered signal is applied to a "X8" multiplier 103 which multiplies the signal by a factor of eight to convert the 4-ary FSK signal to a distorted (mod. index $h = 1$) signal. This signal has spectral lines at each of the four transmitted frequencies multiplied by a factor of eight.

The output of the multiplier 103 is applied to a pair of phase locked loops 104 and 105 which are respectively locked to frequencies eight times the frequencies F1 and F0, (F0 and F1 being the two lowest transmitted frequencies). The outputs of phase locked loops 104 and 105 are combined in mixer 114 to produce a beat frequency which is exactly equal to the symbol rate. This beat frequency is appropriately filtered in a low pass filter 106 to provide a symbol timing signal.

Figure 9:
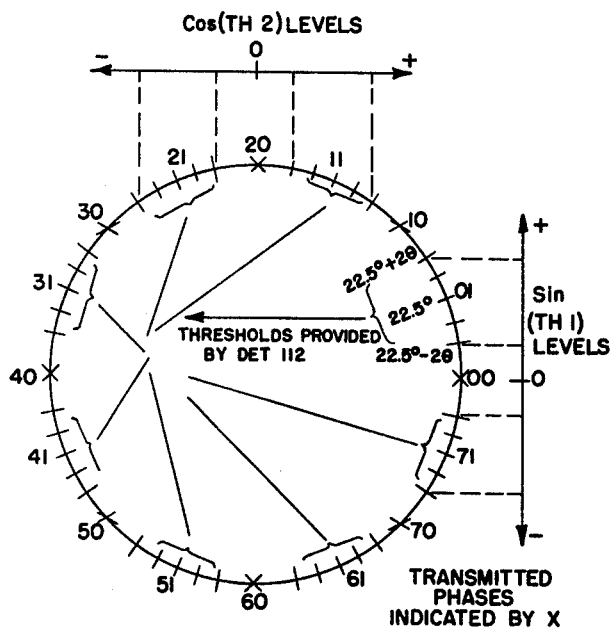

In order to carry out the phase measurement establishing the pair of most likely phase node candidates, a pair of phase detectors 107 and 109, together with their associated threshold detectors 108 and 110 are employed. One input of each of phase detectors 107 and 109 is connected to the output of limiter 102. Their other respective inputs are obtained from a divide by 8 divider 115 which receives from phase locked loop 105 a pair of signals which are shifted in phase by 90° relative to each other and have a frequency equal to eight times the lowest frequency F0, corresponding to SIN 8 F0 and COS 8 F0. Thus, the reference inputs for phase detectors 107 and 109 are SIN F0 and COS F0, respectively. Each of the threshold detectors 108 and 110 is formed of four threshold devices the outputs of which are connected in common to their associated phase detector. The thresholds of the four threshold devices associated with phase detector 107 are equal to those of the devices associated with phase detector 109 and are symmetrically spaced about zero, as shown in FIG. 9. As a result, the phase region $0 - 2\pi$ is effectively subdivided into sixteen equal parts. The angle $\theta$ is the phase distortion introduced by intersymbol interference when two adjacent frequencies (e.g. F1 and F0) are successively transmitted. For a nominal filter, this distortion is 5°, as shown in FIG. 6(b). Each threshold detector 107 and 109 provides a four bit digital number corresponding to which of the sixteen sub-divided regions the phase of the measured input signal relative to the phase of SIN F0 or COS F0 belongs. In more detail, each threshold device of which threshold detector 108 is comprised compares the measured phase-representative voltage with an analog voltage corresponding to one of the levels shown in the right hand portion of FIG. 9 and generates a "1" if the measured voltage exceeds its analog voltage level and generates a "0" if the measured voltage does not exceed its analog voltage level. Thus, assume that the measured phase is 109°, so that the measured phase lies within the region 21 shown in FIG. 9; it will exceed each of the thresholds set at $+12.5°$, $+32.5°$, $-12.5°$, and $-32.5°$, for SIN F0. As a result, threshold detector 108 produces a four-bit number (1111).

Similarly, each threshold device of which threshold detector 110 is comprised compares the measured phase-representative voltage with an analog voltage corresponding to one of the levels shown in the top portion of FIG. 9 and generates a "1" if the measured voltage exceeds its analog voltage level and generates a "0" if the measured voltage does not exceed its analog voltage level. Therefore, for the region 21 of FIG. 9, since the measured voltage is less than the threshold set at $+32.5°$, $+12.5°$, $-12.5°$, but greater than $-32.5°$, for the COS F0 levels with the polarity as shown at the top of FIG. 9 (namely, the detected phase angle exceeds each of 57.5°, 77.5°, 102.5°, but is less than 122.5°), threshold detector produces a four-bit number (1000).

Thus, for the example given above, the four-bit numbers from threshold detectors 108 and 110 indicative of this phase location are supplied to decision logic 113, the construction and operation of which will be described below.

Figure 10:
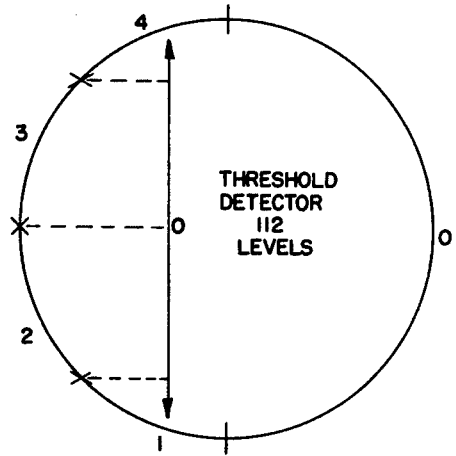

In addition to the phase node pair selection operation described above, a phase refinement or vernier operation is carried out by a third phase detector 111 and its associated threshold detector 112. Threshold detector 112 includes three threshold devices, the voltage levels of which are set to correspond to the three threshold divisions into which each of the eight segments shown in FIG. 9 is sub-divided. Since phase detector 111 compares the phase of the input of multiplier 103 with the 8 F0 reference output of phase locked loop 105, the three levels, shown in FIG. 10, appear as modulo $\pi/4$. Due to the multiplication by a factor of eight, the 45° phase region is converted to a 360° or $2\pi$ phase region, divided into five segments by the three thresholds divisions and the appropriate end boundaries of the phase regions shown in FIG. 9. Threshold detector 112 supplied a three bit digital number to decision logic 113, representative of which, if any, of the three thresholds is exceeded by the detected phase. In the example given above, the measured phase was assumed to be 109°, (i.e. $\pi/2 + 12.5° + 6.5°$). According to the threshold divisions shown in FIG. 10, the measured angle falls in the region 2, so as to be less than each of the analog settings of two of the three threshold devices, but greater than the analog setting of one (in this case, the lowest) of the threshold devices within threshold detector 112. Therefore, a three bit number (100) is supplied to decision logic 113.

Figure 12:
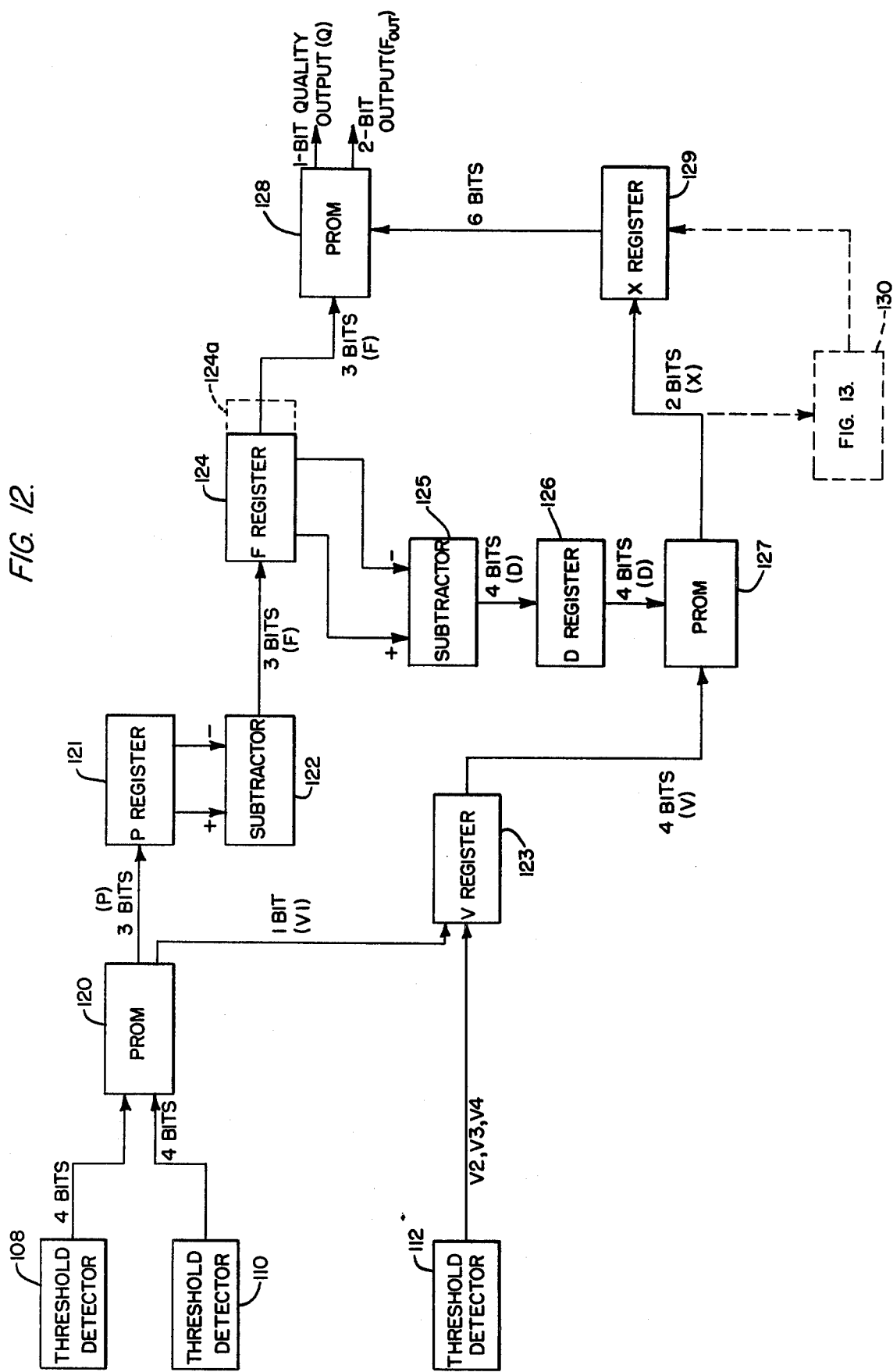
FIG. 12 is a detailed illustration of the constituents of the decision logic portion of FIG. 11.

FIG. 12 shows the details of the decision logic 113 which receives the eleven binary outputs from the eleven threshold devices contained within threshold detectors 108, 110, and 112. The eight bits from threshold detectors 108 and 110 are supplied to a programmable read only memory (PROM) 120 which carries out a logic conversion operation on the eight bits in accordance with Truth Table 1.

TRUTH TABLE 1

| PROM 120 - THRESHOLD OUTPUTS vs. PHASE (P) and VERNIER (V1) OUTPUTS OF PROM 120 | | | |
|---|---|---|---|
| TH 1 | TH 2 | P | V1 |
| 1100 | 1111 | 000 | 0 |
| 1110 | 1111 | 000 | 1 |
| 1111 | 1111 | 001 | 0 |
| 1111 | 1110 | 001 | 1 |
| 1111 | 1100 | 010 | 0 |
| 1111 | 1000 | 010 | 1 |
| 1111 | 0000 | 011 | 0 |
| 1110 | 0000 | 011 | 1 |
| 1100 | 0000 | 100 | 0 |
| 1000 | 0000 | 100 | 1 |
| 0000 | 0000 | 101 | 0 |
| 0000 | 1000 | 101 | 1 |
| 0000 | 1100 | 110 | 0 |
| 0000 | 1110 | 110 | 1 |
| 0000 | 1111 | 111 | 0 |
| 1000 | 1111 | 111 | 1 |

PROM 120 converts the eight bits from threshold detectors 108 and 110 into a three bit number P corresponding to a BCD (binary coded decimal) encoding of the most significant digit identifying the phase region represented by the eight bits from detectors 108 and 110 and a one bit vernier number V1 indicative of whether within that phase region there exists a legitimate phase node. The one bit number is a "0" if there exists a legitimate phase node within that region, and is a "1" if a legitimate phase node does not exist within that region. Thus, for the example described above, region 21, represented by the eight bits(1111, 1000)from respective threshold detectors 108 and 110, is encoded as the three bit P number (010) and a one bit vernier number V1 (1). Of course, in place of PROM 120, appropriate combinational logic can be used to implement the conversion process defined by Truth Table 1. For each symbol time a new phase measurement operation is carried out, and as each three bit P number is generated it is shifted into a two-stage, three-bit shift register 121. By subtracting the contents of the two stages from each other, there will be produced a three bit number representative of the phase difference between the beginning and end of each symbol time. Subtractor 122, therefore, provides a three-bit number representative of a frequence estimate F. Although the actual transitted frequency is one of the four-frequencies F0-F3, represented by the digits 00 (for F0), 01 (for F1), 10 (for F2), and 11 (for F3), noise conditions can cause subtractor 122 to produce an estimated frequency representative of −1 or +4. Hence, three bits are used to represent the frequency in register 124. These three-bit numbers are successively shifted into shift register 124 and the frequency-representing bits in the first two stages are subtracted from each other in subtractor 125 to produce a four-bit difference number (D) which represents the difference between the two frequencies. This subtraction process is carried out to provide an indication of the phase distortion resulting from the frequency estimates obtained (since phase distortion is determined by the difference in successive frequencies on either side of a phase node).

Since each frequency representation can take on one of the above six values −1, 0, 1, 2, 3, 4, the difference number (D) is represented as a four-bit number stored in register 126.

The vernier bit V1 from PROM 120 and the three bits from the three threshold devices in threshold detector 112, hereinafter designated as vernier bits V2, V3 and V4, are stored as a four-bit number in vernier register 123.

In the above example, the vernier (V) register 123 stores the three vernier bits V2, V3 and V4 corresponding to the output (100) of the threshold devices of threshold detector 112. Since, no legitimate phase node lies within region 21, PROM 120 supplies a "1" for the vernier bit V1 which is also stored in register 123; therefore, register 123 stores the four-bits (1100). These four vernier bits V1 - V4 and the four-bit number D are supplied to a PROM 127 which generates a two-bit output number X in accordance with Truth Table 2.

TRUTH TABLE 2

| PROM 127 - X OUTPUT vs. VERNIER AND DIFFERENCE INPUTS | | | | | | | | | | | |
|---|---|---|---|---|---|---|---|---|---|---|---|
| | | | | | | | D | | | | |
| V1 | TH 3 | V | −4 | −3 | −2 | −1 | 0 | +1 | +2 | +3 | +4 |
| 0 | 000 | 0 | 11 | 11 | 11 | 11 | 11 | 10 | 01 | 00 | 00 |
| 1 | 000 | 1 | 11 | 11 | 11 | 11 | 10 | 01 | 00 | 00 | 00 |
| 1 | 100 | 2 | 11 | 11 | 11 | 10 | 01 | 00 | 00 | 00 | 00 |
| 1 | 110 | 3 | 11 | 11 | 10 | 01 | 00 | 00 | 00 | 00 | 00 |
| 1 | 111 | 4 | 00 | 00 | 00 | 00 | 00 | 00 | 00 | 00 | 00 |

Truth Table 2 defines the algorithm by which a tentative choice is made between the two phase node candidates, between which the measured phase lies. This algorithm takes into account the phase region divisions as shown in FIG. 9, (represented by the four vernier bits V1 - V4) as well as the phase distortion (represented by the four bit number D) caused by the action of the nominal filter on the received FSK signal (as depicted in FIG. 6) and effectively corrects the measured phase to a tentative choice of the phase node with which the actually transmitted phase coincides. This algorithm choice is represented by the most significant bit of each of the two bit numbers X shown in the lower right hand portion of Truth Table 2. The most significant bit is "0" if the phase candidate P should be tentatively selected, while it is a "1" if the other phase candidate P+1 should be tentatively selected.

The least significant bit of each of these two bit numbers represents the accuracy of the tentative choice of the one of the two phase nodes of interest.

More specifically, as was described earlier, due to the behavior of the nominal filter on FSK signals, it is known that the maximum error which can occur in determining the tentative phase distortion is a deviation of ±5°. This means that the location of the proper threshold for the tentative phase decision is at most in error by only ±5°.

From this knowledge, a second algorithm can be created to indicate whether or not the ±5° shift could cause a change in the tentative choice of phse node P or P+1. In other words, upon further refinement, the tentative choice of the one of the pair of phase nodes may be changed, depending upon where the measured phase lies. According to the algorithm the least significant bit of the number X is a "0" if the tentative phase node choice would not change even if there was an error, and it is a "1" if the tentative choice could change if there was an error. This two bit number X is stored in a four-sample X shift register 129.

From the register 129, the most significant bits of the two bit numbers in the first and fourth stages are supplied, together with both bits of each of the two bit numbers in the second and third stages, to a third programmable read-only memory (PROM) 128. These six bits are sufficient to make two successive "final" decisions on phase; therefore, a final decision on frequency can be carried out in differential form (namely, whether the stored frequency should be advanced or reduced by one frequency, or left unchanged). PROM 128 operates in accordance with Truth Table 3.

TRUTH TABLE 3

PROM 128 - F out (OUTPUT) vs. X AND F INPUTS

| — | 0 | 2 | 1 | |
|---|---|---|---|---|
| $X_1$ (MSB) | $X_2$ | $X_3$ | $X_4$ (MSB) | |
| 0 | 0 | 1 | 0 | |
| 1 | 2 | 3 | 1 | F out = F + 1 |
| 1 | 0,1 | 1 | 0 | |
| 1 | 2 | 2,3 | 0 | |
| — | 0,1 | 2,3 | 0 | |
| 0 | 1 | 0 | 0 | |
| 1 | 3 | 2 | 1 | F out = F − 1 |
| 0 | 1 | 0,1 | 1 | |
| 0 | 2,3 | 2 | 1 | |
| — | 2,3 | 0,1 | — | |

If Fout > 3, Fout = 3     If Fout < 0, Fout = 0
All other combinations     | F out = F In Truth Table 3, only those conditions which require a change in the calculated frequency are listed.

PROM 128 operates on the three bit frequency representative number from register 124, and, depending upon the information contained in the six bit number received from register 129, produces an output which increases or decreases the frequency. Since there are only four frequencies which can be transmitted, i.e. F0, F1, F2, and F3, represented by bits 00, 01, 10, and 11, PROM 128 is programmed in accordance with Truth Table 3 to select as the output frequency Fout the closest legitimate frequency. I. e. as shown in Truth Table 3, Fout = 3 if the Fout representative number is determined to be greater than 3, and Fout = 0 if the Fout representative number is determined to be less than 0. If desired, a single quality bit Q can be provided to represent such an occurrence. Thus, as PROM 128 operates on the series of numbers sequentially shifted in from the F and X registers 124 and 129 respectively, it operates on this information in accordance with the algorithm defined in Truth Table 3 and generates a series of two bit numbers Fout representative of the frequency constituents of the transmitted FSK signal.

While the system as basically illustrated in FIG. 12 provides an accuracy, suitable for present day FSK communication techniques, within about 1dB of the theoretical optimum receiver having no signal distortion, if desired, it is also possible to effect further refinements of the phase estimates and frequency determinations from such estimates by incorporating additional decision logic circuitry. Such circuitry is illustrated in broken line form in FIG. 12 and is shown in detail in FIG. 13.

In lieu of supplying the two bits from output of PROM 127 directly to X register 129, as shown in solid line form in FIG. 12, an alternative arrangement can be provided whereby the two bits are coupled to a first intermediate register 133. Register 133 is composed of three stages $X_1$, $X_2$, and $X_3$, four prescribed outputs of which are connected to PROM 131, which "refines" the phse estimates in accordance with the algorithm defined in Truth Table 4 below.

TRUTH TABLE 4

TRUTH TABLE RELATING VALUES OF X TO FINAL DECISION

| $X_1$ (MSB) | $X_2$ | $X_3$ (MSB) | PROM MSB OUT |
|---|---|---|---|
| 0 | 1,2,3, | 1 | 1 |
| 0 | 0 | 0 | 0 |
| 0 | 2,3 | 1 | 1 |
| 0 | 0,1 | 0 | 0 |
| 1 | 2,3 | 1 | 1 |
| 1 | 0,1 | 0 | 0 |
| 1 | 3 | 1 | 1 |
| 1 | 0,1,2 | 0 | 0 |

Figure 13:
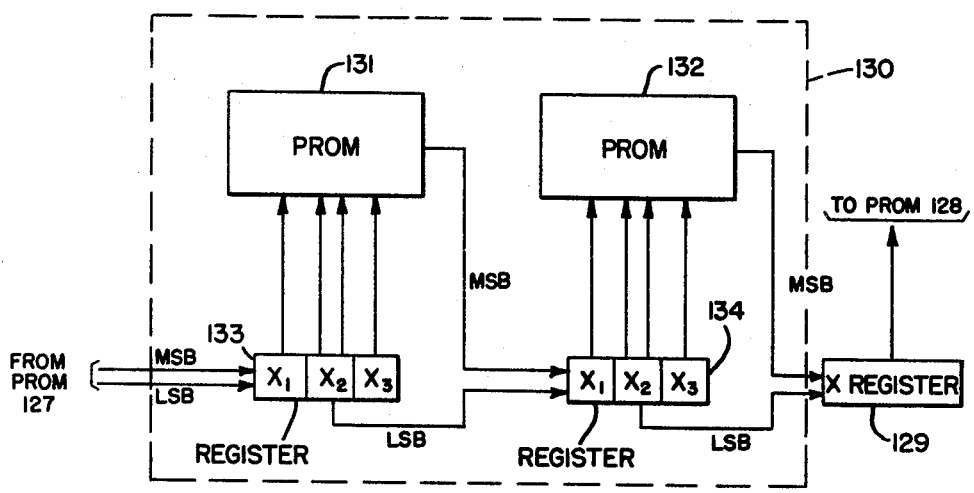
FIG. 13 illustrates a modification of a portion of the decision logic circuitry of FIG. 12.

Register 133 and PROM 131 may, in turn be connected to register 134, which, like register 133, is coupled to a further PROM 132 which effects a further phase refinement, also in accordance with the algorithm defined in Truth Table 4. In other words, depending upon the degree of refinement sought, additional vernier decision logic can be inserted in the arrangement of FIG. 12 in the manner shown in FIG. 13 to provide the desired degree of performance. FIG. 13 shows decision logic for an additional two successive iterations of refinement. However, fewer or additional such iterations can be used simply by appropriately cascading a respective register-PROM set between PROM 127 and X register 129, and satisfying Truth Table 4 for that set. Of course, to allow for the processing delay imparted by each cascaded set, an additional respective stage such as stage 124a shown in broken line form in FIG. 12 is added to register 124. Thus, for the pair of successive register-PROM sets 133 - 131, 134 - 132 shown in FIG. 13, an additional pair of stages would be added to the F register 124 in FIG. 12, to ensure proper timing.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A method of demodulating a coherent frequency shift keyed (FSK) signal having a modulation index h, wherein data symbols are represented by discrete frequencies, and the difference in phase between symbol transition times is representative of symbol frequency, comprising the steps of:
   (a) measuring the phase of the FSK signal relative to the phase of one of the frequency components which may be contained in said FSK signal at instants in time corresponding to transition times between successive symbols;
   (b) identifying respective pairs of phase nodes $n2\pi h$ and $(n+1)2\pi h$, where n is an integer, which correspond to those legitimate phases by which the FSK signal may be defined and near which nodes the respective phases measured in step (a) lie;
   (c) estimating, for each symbol transition time, the phase distortion introduced into said FSK signal and resulting in a shift of the phase of the FSK signal at said transition times to values other than those of legitimate phase nodes;

(d) selecting, for each symbol transition time, one of the phase node values $n2\pi h$ and $(n+1)2\pi h$ identified for each respective symbol transition time in step (b) in the basis of the phase distortion estimates obtained in step (c); and (e) deriving a sequence of frequencies by determining the differences between successive ones of the phase node values selected in step (d).

2. A method according to claim 1, wherein step (c) comprises the steps of:

(c1) for each symbol transition time, determining those symbol frequencies, the transition between which occurs at said each symbol transition time, which are capable of representing the phase changes which result in the respective pair of phase node values identified in step (b), (c2) measuring the difference in those said symbol frequencies determined in step (c1), (c3) converting the frequency differences measured in step (c2) into values of phase distortion based upon filter characteristics, and (c4) selecting a compromise distortion which is the mid-point between the extreme distortions determined in step (c3).

3. A method according to claim 1, wherein step (d) comprises the steps of:

(d1) sub-dividing the difference between said phase node values $n2\pi h$ and $(n+1)2\pi h$, respectively identified for each symbol transition time, into a prescribed number of sub-phase regions, (d2) identifying in which of said sub-phase regions the measured phase of said FSK signal lies, and (d3) tentatively selecting one of said phase node values $n2\pi h$ and $(n+1)2\pi h$ in dependence upon said identified sub-phase region and the value of phase distortion etimated in step (c).

4. A method according to claim 2, wherein step (d) comprises the steps of:

(d1) sub-dividing the difference between said phase node values $n2\pi h$ and $(n+1)2\pi h$, respectively identified for each symbol transition time, into a prescribed number of sub-phase regions, (d2) identifying in which of said sub-phase regions the measured phase of said FSK signal lies, and (d3) tentatively selecting one of said phase node values $n2\pi h$ and $(n+1)2\pi h$ in dependence upon said identified sub-phase region and the value of phase distortion estimated in step (c).

5. A method according to claim 4, wherein step (d) further comprises the step of:

(d4) indicating, on the basis of the location of the sub-phase region identified in step (d2) and the phase distortion estimated in step (c), the degree of accuracy of the tentative selection made in step (d3).

6. A method according to claim 4, wherein step (d) further comprises the steps of:

(d4) selecting a phase distortion based upon the tentative decisions of the phase node pairs in the adjacent symbols and the phase node pair for the symbol in question, and (d5) finally selecting one of said phase node values $n2\pi h$ and $(n+1)2\pi h$ in dependence upon said identified sub-phase region and the value of phase distortion estimated in step (d4).

7. A method according to claim 6, wherein steps (d4) and (d5) are iterated using the decision of the previous iterations as the tentative decisions.

8. An apparatus for demodulating a coherent frequency shift keyed (FSK) signal having a modulation index $h$, wherein data symbols are represented by discrete frequencies, and the difference in phase between symbol transition times is representative of symbol frequency, comprising:

first means for measuring the phase of said FSK signal relative to the phase of one of the frequency components which may be contained in said FSK signal at instants in time corresponding to transition times between successive symbols;

second means, coupled to said first means, for generating an output reprsentative of a respective pair of phase nodes $n2\pi h$ and $(n+1)2\pi h$, where $n$ is an integer, which corresponds to those legitimate phases by which the FSK signal may be defined and near which nodes the phase measured by said first means lies;

third means, coupled to said second means, for generating an output representative of, for each symbol transition time, an estimate of the phase distortion introduced into said FSK signal and resulting in a shift of the phase of the FSK signal at a transition time to a value other than a legitimate phase node value;

fourth means, coupled to said first, second, and third means, for selecting, for each symbol transition time, one of the phase node values $n2\pi h$ and $(n+1)2\pi h$ in dependence upon the estimated phase distortion representative output of said second means and the actual phase as measured by said first means; and fifth means, coupled to said fourth means, for determining the differences between successive ones of the phase node values selected by said fourth means and generating therefrom an output representative of the sequence of frequencies making up said FSK signal.

9. An apparatus according to claim 8, wherein said second means comprises means for generating an output which represents into which phase region, of a $2\pi$ region divided into $(1/h)$ phase regions, the phase of the FSK signal measured by said first means lies.

10. An apparatus according to claim 9, wherein said third means comprises:

means, coupled to said second means, for subtracting sequential outputs generated by said second means from each other and generating a subtraction output representative thereof, and means, coupled to said subtracting means, for generating an output representative of the difference between successive subtraction outputs generated by said subtracting means.

11. An apparatus according to claim 10, wherein said fourth means comprises:

means for effectively dividing each of said phase regions into a prescribed number of sub-phase regions and generating an output which represents in which of said sub-phase regions said measured phase of said FSK signal lies, and means, responsive to the output from said third means representative of the difference between successive subtraction outputs generated by said subtracting means, and responsive to the output of said effectively dividing means, for generating an output representative of a selected one of said phase node values $n2\pi h$ and $(n+1)2\pi h$ in accordance with a predetermined relationship between the output of said effectively dividing means and said output from said third means.

12. An apparatus according to claim 11, wherein said fourth means further includes means for generating an output representative of the accuracy of the output representative of the selected one of said phase node values $n2\pi h$ and $(n+1)2\pi h$.

13. An apparatus according to claim 12, wherein said first means comprises a first phase-locked loop locked to an integral multiple of the lowest frequency which may be contained within said FSK signal, and first and second phase detectors, coupled to receive a pair of the outputs of said loop shifted by 90° relative to each other and to receive said FSK signal, for producing respective outputs which, together, represent in which of said phase regions, the phase of the FSK signal lies.

14. An apparatus according to claim 13, further comprising a second phase-locked loop locked to said integral multiple of the second lowest frequency which may be contained within said FSK signal, and a mixer for combining the outputs of said first and second phase-locked loops and generating an output corresponding to the symbol rate.

* * * * *

UNITED STATES PATENT AND TRADEMARK OFFICE
CERTIFICATE OF CORRECTION

PATENT NO. : 4,096,442
DATED : June 20, 1978
INVENTOR(S) : Daniel D. McRae, et al.

It is certified that error appears in the above—identified patent and that said Letters Patent is hereby corrected as shown below:

In column 1, before the heading "BACKGROUND OF FSK SIGNALLING", insert the following:

--The present invention relates to subject matter developed under U. S. government contract F03602-74-C-0263.--

Signed and Sealed this

Seventeenth Day of November 1981

[SEAL]

Attest:

GERALD J. MOSSINGHOFF

Attesting Officer    Commissioner of Patents and Trademarks